(12) United States Patent
Marukawa et al.

(10) Patent No.: US 10,663,285 B2
(45) Date of Patent: May 26, 2020

(54) SENSOR HEAD (71) Applicant: OMRON Corporation, Kyoto (JP)

(72) Inventors: Mariko Marukawa, Fukuchiyama (JP); Takahiro Okuda, Kyoto (JP); Kosuke Sugiyama, Nantan (JP)

(73) Assignee: OMRON Corporation, Kyoto (JP)

( * ) Notice: Subject to any disclaimer, the term of this patent is extended or adjusted under 35 U.S.C. 154(b) by 44 days.

(21) Appl. No.: 16/129,830

(22) Filed: Sep. 13, 2018

(65) Prior Publication Data
US 2019/0101374 A1 Apr. 4, 2019

(30) Foreign Application Priority Data

Oct. 2, 2017 (JP) .................................. 2017-193104

(51) Int. Cl.
| | |
|---|---|
| *G01B 9/04* | (2006.01) |
| *G11B 11/105* | (2006.01) |
| *G01B 11/02* | (2006.01) |
| *G01B 11/24* | (2006.01) |
| *G01B 11/06* | (2006.01) |

(52) U.S. Cl.
CPC .............. *G01B 11/026* (2013.01); *G01B 9/04* (2013.01); *G01B 11/0608* (2013.01); *G01B 11/24* (2013.01); *G11B 11/10532* (2013.01); *G01B 2210/50* (2013.01)

(58) Field of Classification Search
CPC ... G01B 11/026; G01B 11/14; G01B 11/0608; G01B 11/24; G01B 2210/50; G01B 9/04; G11B 11/10532
See application file for complete search history.

(56) References Cited

U.S. PATENT DOCUMENTS

| | | |
|---|---|---|
| 5,785,651 A | 7/1998 | Kuhn et al. |
| 9,261,351 B1 | 2/2016 | Patzwald |
| 10,168,619 B1 * | 1/2019 | Zweering ............ G03F 7/70825 |

FOREIGN PATENT DOCUMENTS

| | | |
|---|---|---|
| CN | 102997952 | 3/2013 |
| CN | 103673887 | 3/2014 |
| EP | 2811259 | 12/2014 |
| JP | H06273136 | 9/1994 |

(Continued)

OTHER PUBLICATIONS

Omron, "A Grooved-type Sensor That Doesn't Require Optical Axes Alignment", Grooved-type Photoelectric Sensor, E3S-GS3E4, Sep. 2015, pp. 1-3.

(Continued)

*Primary Examiner* — Hina F Ayub
*Assistant Examiner* — Amanda Merlinjo
(74) *Attorney, Agent, or Firm* — JCIPRNET (57) ABSTRACT

Provided is a sensor head that can increase the flexibility of installation. The sensor head is a sensor head of a sensor for measuring displacement of a measurement object. The sensor head includes: a diffractive lens generating chromatic aberration along an optical axis direction on an incident light, a case part housing at least the diffractive lens inside, and fixing parts and used for fixing to a fixing object. The case part includes a cylindrical part having a cylindrical outer shape, and the outer shapes of the fixing parts and are within the outer shape of the cylindrical part when viewed in a central axis direction of the cylindrical part.

20 Claims, 8 Drawing Sheets

(56) References Cited

FOREIGN PATENT DOCUMENTS

| | | |
|---|---|---|
| JP | D1262807 | 12/2005 |
| JP | 2017116492 | 6/2017 |
| TW | 201337239 | 9/2013 |
| TW | M497768 | 3/2015 |

OTHER PUBLICATIONS

Office Action of Korean Counterpart Application, with English translation thereof, dated Jul. 21, 2019, pp. 1-9.
"Search Report of Europe Counterpart Application", dated Dec. 4, 2018, p. 1-p. 6.
Office Action of Taiwan Counterpart Application, with English translation thereof, dated Mar. 26, 2019, pp. 1-10.
"Office Action of Taiwan Counterpart Application," with English translation thereof, dated Jan. 22, 2020, p. 1-p. 10.

\* cited by examiner

SENSOR HEAD

CROSS-REFERENCE TO RELATED APPLICATION

This application claims the priority benefit of Japanese application serial no. 2017-193104, filed on Oct. 2, 2017. The entirety of the above-mentioned patent application is hereby incorporated by reference herein and made a part of this specification.

BACKGROUND

Technical Field

The disclosure relates to a sensor head.

Description of Related Art

Conventionally, a confocal measuring device that utilizes a confocal optical system is used as a device for measuring displacement of a measurement object in a non-contact manner.

For example, the confocal measuring device described in the following Patent Document 1 (specification of U.S. Pat. No. 5,785,651) has a confocal optical system that uses a diffractive lens between the light source and the measurement object. In this confocal measuring device, the light emitted from the light source is irradiated on the measurement object by the confocal optical system at a focal distance corresponding to the wavelength thereof. Then, displacement of the measurement object can be measured by detecting the peak of the wavelength of the reflected light.

The sensor head of the confocal measuring device, etc. may be fixedly used so as not to cause positional displacement with respect to the measurement object. For example, the following Patent Document 2 (Japanese Laid-Open No. H6-273136) has disclosed a fixture for attaching the sensor head to a predetermined position.

However, fixing the sensor head using the fixture may cause the fixture to interfere with other members, and the places where the sensor head can be installed may be limited.

SUMMARY

Therefore, the disclosure provides a sensor head that can increase the flexibility of installation.

A sensor head according to an embodiment of the disclosure is a sensor head of a sensor for measuring displacement of a measurement object. The sensor head includes: a diffractive lens generating chromatic aberration along an optical axis direction on an incident light; an objective lens gathering the incident light on the measurement object; a case part housing at least the diffractive lens and the objective lens inside; and a fixing part used for fixing to a fixing object, wherein the case part includes a cylindrical part that has a cylindrical outer shape, and an outer shape of the fixing part is within the outer shape of the cylindrical part when viewed in a central axis direction of the cylindrical part.

DESCRIPTION OF THE EMBODIMENTS

A sensor head according to an embodiment of the disclosure is a sensor head of a sensor for measuring displacement of a measurement object. The sensor head includes: a diffractive lens generating chromatic aberration along an optical axis direction on an incident light; an objective lens gathering the incident light on the measurement object; a case part housing at least the diffractive lens and the objective lens inside; and a fixing part used for fixing to a fixing object, wherein the case part includes a cylindrical part that has a cylindrical outer shape, and an outer shape of the fixing part is within the outer shape of the cylindrical part when viewed in a central axis direction of the cylindrical part.

According to the embodiment, the case part has the cylindrical part and the outer shape of the fixing part is within the outer shape of the cylindrical part when viewed in the central axis direction of the cylindrical part, by which the fixing part can be prevented from interfering with other members, and the flexibility of installation of the sensor head can be increased.

In the above-described embodiment, the fixing part may extend to overlap an axis orthogonal to the central axis when viewed in the central axis direction of the cylindrical part.

According to the embodiment, the width of the fixing part can be maximized in a range that the fixing part is within the outer shape of the cylindrical part, and the fixing to the fixing object can be further strengthened.

In the above-described embodiment, the fixing part may be provided at a position different from the diffractive lens and the objective lens in the central axis direction of the cylindrical part.

According to the embodiment, since the presence of the fixing part is not a factor that narrows the apertures of the diffractive lens and the objective lens, while these apertures are increased to nearly the inner diameter of the case part to sufficiently increase the amount of light taken in, the fixing part can be large enough to fix the sensor head.

In the above-described embodiment, the fixing part may be provided in an end part of the cylindrical part in the central axis direction of the cylindrical part.

According to the embodiment, since the presence of the fixing part is not a factor that narrows the aperture of the case part, while the inner diameter of the case part is increased to sufficiently increase the amount of light taken in, the fixing part can be large enough to fix the sensor head.

In the above-described embodiment, the cylindrical part may have an insertion hole in the end part for inserting an optical fiber optically connected to the diffractive lens, and the fixing part may be provided at a position overlapping the insertion hole in the central axis direction of the cylindrical part.

According to the embodiment, the total length of the case part in the central axis direction of the cylindrical part can be reduced as compared with the case where the fixing part is provided at a position not overlapping the insertion hole in the end part of the cylindrical part, and the sensor head can be downsized.

In the above-described embodiment, the fixing part may be formed integrally with the case part.

According to the embodiment, by fixing the fixing part to the fixing object, the case part is also fixed, and the sensor head is securely fixed to the fixing object.

In the above-described embodiment, the fixing part may be plate-shaped and may have two flat surfaces parallel to each other.

According to the embodiment, if the fixing object has a flat surface, the plate-shaped fixing part that has two flat surfaces parallel to each other can be fixed to be in surface contact with the fixing object, and the sensor head can be firmly fixed easily.

In the above-described embodiment, the flat surfaces may extend along the central axis of the cylindrical part.

According to the embodiment, when the fixing part is fixed to the fixing object, the optical axis directions of the diffractive lens and the objective lens are oriented in a direction along a fixing object surface of the fixing object, and it is easy to align the sensor head.

In the above-described embodiment, the fixing part may have a through hole.

According to the embodiment, by disposing a screw, etc. through the through hole, the fixing part can be fixed to the fixing object and the sensor head can be easily fixed.

According to the disclosure, it is possible to provide a sensor head that can increase the flexibility of installation.

Exemplary embodiments of the disclosure will be described with reference to the accompanying drawings. In the drawings, parts denoted by the same reference numerals have the same or similar configurations.

Figure 1:
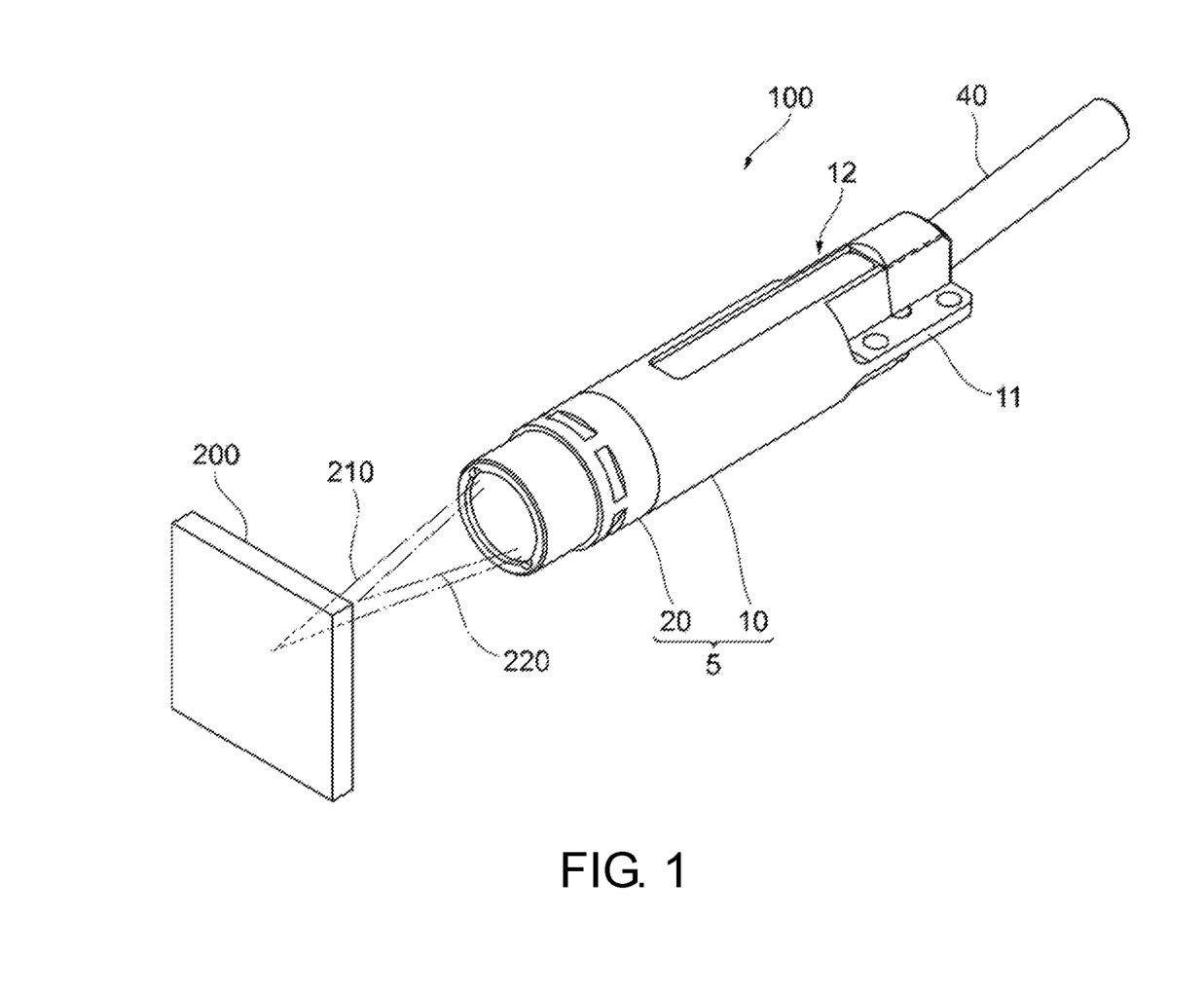
FIG. 1 is a perspective view of the sensor head according to an embodiment of the disclosure.

FIG. 1 is a perspective view of a sensor head 100 according to an embodiment of the disclosure. The sensor head 100 according to the present embodiment is a sensor head 100 of a sensor for measuring displacement of a measurement object 200, and includes a case part 5, a first fixing part 11, a second fixing part 12, and a fiber case 40. An optical fiber for guiding light from a white light source is inserted into the fiber case 40.

The case part 5 includes a cylindrical part 10 having a cylindrical outer shape and an objective lens part 20 for gathering light on the measurement object 200. A diffractive lens is housed inside the cylindrical part 10 for generating chromatic aberration along the optical axis direction on the white light emitted from the optical fiber that defines a pinhole on an end surface. The objective lens part 20 is disposed on the side of the measurement object 200 with respect to the diffractive lens and gathers light with chromatic aberration generated by the diffractive lens on the measurement object 200. In this example, light 210 of a first wavelength having a relatively long focal distance and light 220 of a second wavelength having a relatively short focal distance are shown. In the case of this example, the light 210 of the first wavelength is focused on the surface of the measurement object 200 while the light 220 of the second wavelength is focused before the measurement object 200.

The light reflected by the surface of the measurement object 200 is gathered by the objective lens part 20 and returned to the optical fiber through the diffractive lens. Because the light 210 of the first wavelength in the reflected light is focused by the optical fiber, most of it is incident to the optical fiber. However, the light of other wavelengths is not focused by the optical fiber, and most of it is not incident to the optical fiber. The light incident to the optical fiber is transmitted to a spectroscope (not shown) connected to the optical fiber. The spectroscope detects the peak of the wavelength of the light reflected by the surface of the measurement object 200 and gathered by the sensor head 100 and measures displacement of the measurement object 200 based on the peak of the wavelength that is detected.

The spectroscope can measure displacement of the measurement object 200 with a resolution of tens of nanometers (nm) if the sensor head 100 is in a stationary state. In order to realize such high resolution, it is necessary that the sensor head 100 is securely fixed to a fixing object. The sensor head 100 according to the present embodiment includes a first fixing part 11 and a second fixing part 12 used for fixing to the fixing object, and the outer shapes of the first fixing part 11 and the second fixing part 12 are within the outer shape of the cylindrical part 10 when viewed in the central axis direction of the cylindrical part 10. That is, the first fixing part 11 and the second fixing part 12 are shaped so as not to protrude from the outer shape of the cylindrical part 10 when viewed from the rear surface of the cylindrical part 10 in the direction along the central axis of the cylindrical part 10. In the sensor head 100 according to the present embodiment, when viewed from the rear surface of the cylindrical part 10 in the direction along the central axis of the cylindrical part 10, the outer shapes of the first fixing part 11 and the second fixing part 12 are on the outer shape of the cylindrical part 10, that is, on the contour of the cylindrical part 10. However, when viewed from the rear surface of the cylindrical part 10 in the direction along the central axis of the cylindrical part 10, the outer shapes of the first fixing part 11 and the second fixing part 12 may be on the inner side of the outer shape of the cylindrical part 10. Here, the first fixing part 11 and the second fixing part 12 are an example of the "fixing part" of the disclosure.

Thus, the case part 5 has the cylindrical part 10, and the outer shapes of the first fixing part 11 and the second fixing part 12 are within the outer shape of the cylindrical part 10 when viewed in the central axis direction of the cylindrical part 10, by which the first fixing part 11 and the second fixing part 12 are prevented from interfering with other members and the flexibility of installation of the sensor head 100 can be increased.

In a case where a plurality of sensor heads 100 are arranged for simultaneously measuring displacement of a plurality of places of the measurement object 200, even if a plurality of the sensor heads 100 of the present embodiment are densely arranged, the first fixing parts 11 and the second fixing parts 12 do not interfere with each other. Therefore, it is possible to shorten the distances between the sensor heads 100 to densely fix them.

Configuration Example

Figure 2:
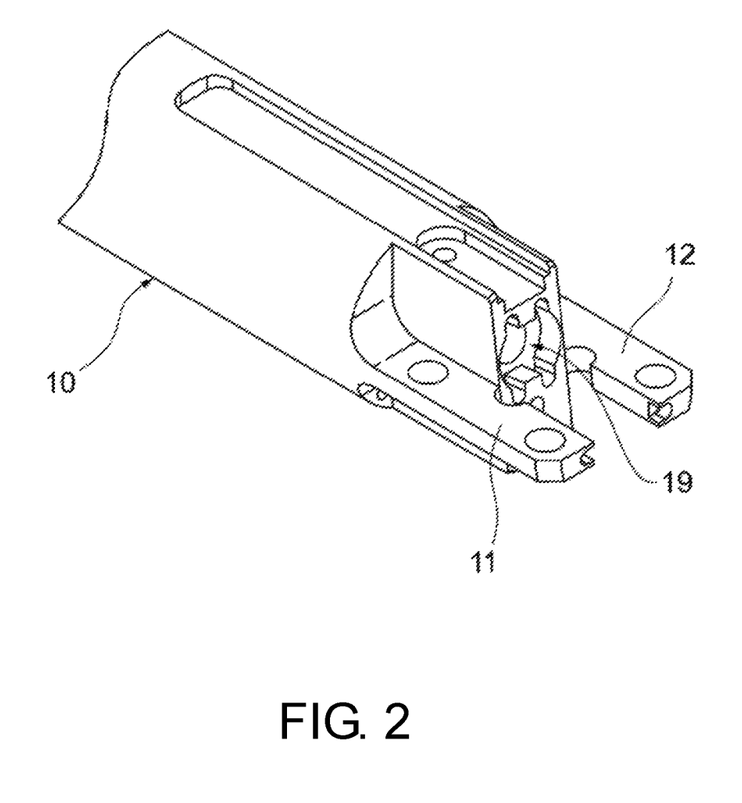
FIG. 2 is an exploded perspective view of the sensor head according to the present embodiment.
Figure 3:
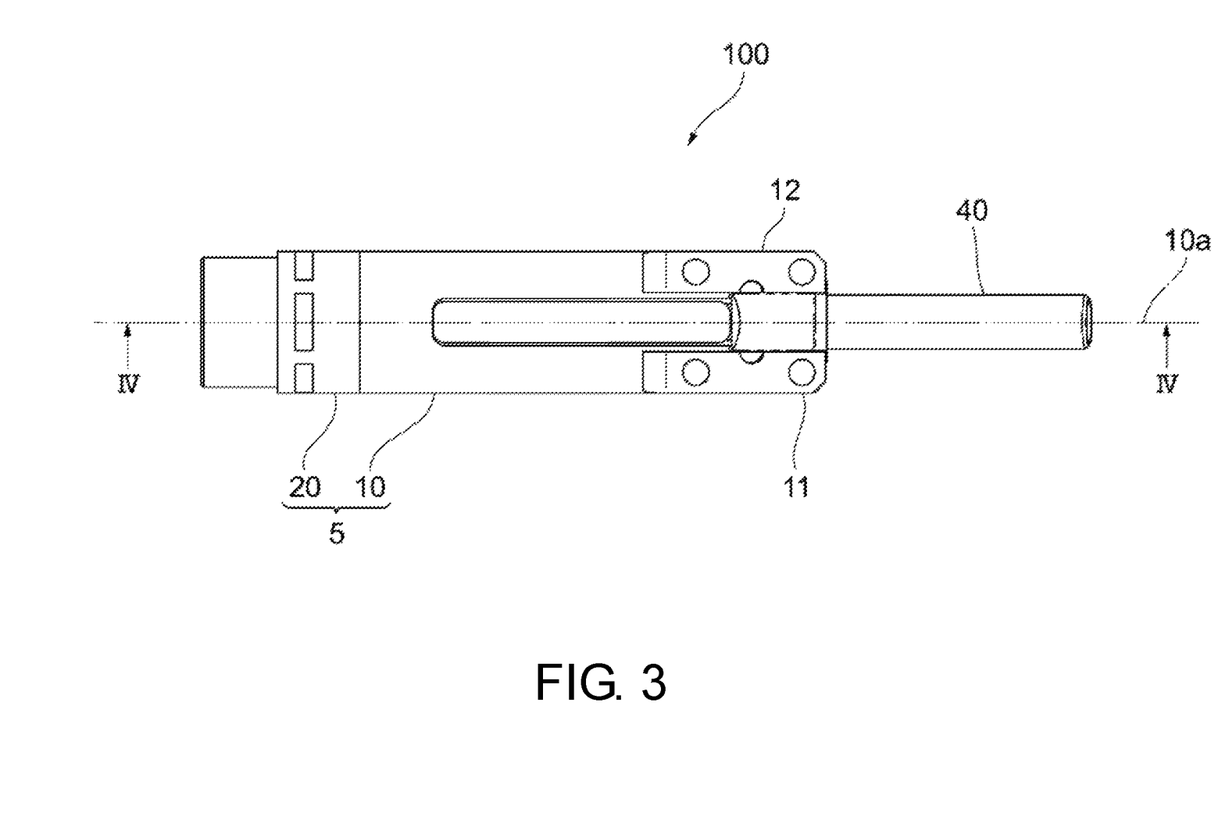
FIG. 3 is a top view of the sensor head according to the present embodiment.
Figure 4:
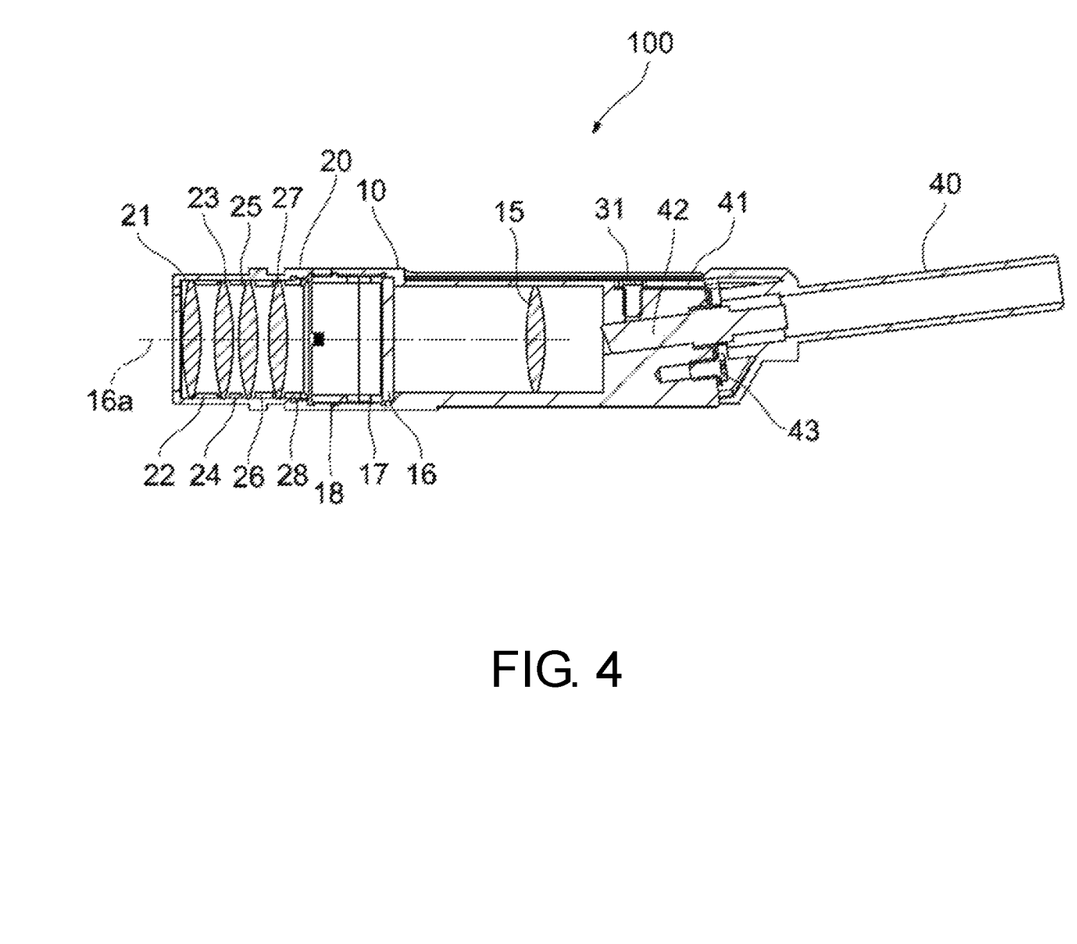
FIG. 4 is a cross-sectional view of the sensor head according to the present embodiment.
Figure 5:
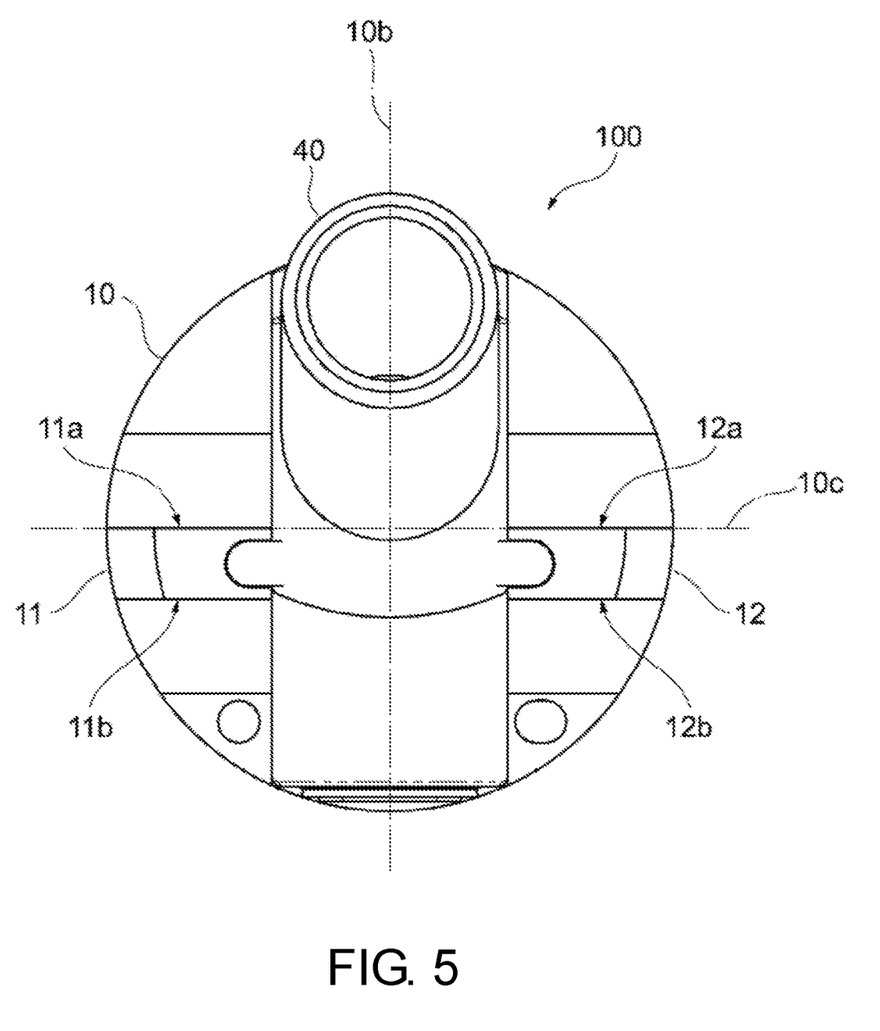
FIG. 5 is a rear view of the sensor head according to the present embodiment.

Next, an example of the configuration of the sensor head 100 according to the present embodiment will be described with reference to FIG. 2 to FIG. 5. FIG. 2 is an exploded perspective view of the sensor head 100 according to the present embodiment. FIG. 3 is a top view of the sensor head 100 according to the present embodiment. FIG. 4 is a cross-sectional view of the sensor head 100 according to the present embodiment. In FIG. 3, the central axis 10a of the cylindrical part 10 is shown, and the central axis 10a is consistent with the IV-IV line representing the drawing direction of the cross-sectional view of the sensor head 100 shown in FIG. 4. Further, FIG. 5 is a rear view of the sensor head 100 according to the present embodiment.

<Objective Lens Part>

The objective lens part 20 of the case part 5 includes a first lens 21, a first spacer 22, a second lens 23, a second spacer 24, a third lens 25, a third spacer 26, a fourth lens 27, and a first lens presser 28 in order from the side of the measurement object 200 (see FIG. 1). The first lens 21, the second lens 23, the third lens 25, and the fourth lens 27 are an objective lens group that gathers light on the measurement object 200, and are a lens group that is combined so as not to generate wavefront aberration. The objective lens group 21, 23, 25, and 27 is fixed inside the objective lens part 20 with its optical axis consistent with an optical axis 16a of the diffractive lens 16. Although this example illustrates that four lenses are housed in the objective lens part 20, the number and types of the lenses housed in the objective lens part 20 are not particularly limited.

If the diffractive lens 16 is a lens that gathers light on the measurement object 200 while generating chromatic aberration along the direction of the optical axis 16a, a part or all of the objective lens group 21, 23, 25, and 27 may be omitted.

<Cylindrical Part>

The cylindrical part 10 of the case part 5 houses a collimating lens 15 and the diffractive lens 16. The diffractive lens 16 generates chromatic aberration along the direction of the optical axis 16a on the incident light. The diffractive lens 16 may be a lens with a focal distance inversely proportional to the wavelength of the light. The diffractive lens 16 is pressed from the side of the measurement object 200 by a ring-shaped second lens presser 17 formed with external thread on the outer side, and is fixed inside the cylindrical part 10. Further, an adapter 18 is a ring-shaped member formed with external thread on the outer side, and is a joint that connects the cylindrical part 10 and the objective lens part 20. The collimating lens 15 gathers the light emitted from a ferrule 42 and causes the light to be incident on the diffractive lens 16. Moreover, the collimating lens 15 gathers the light that is incident through the objective lens group 21, 23, 25, and 27 and the diffractive lens 16 on the ferrule 42.

The case part 5 may include configurations other than the objective lens part 20 and the cylindrical part 10. For example, the case part 5 may include a bent part, which has an internal cavity and an L-shaped outer shape, between the objective lens part 20 and the cylindrical part 10. The bent part has at least a mirror inside, and the mirror reflects the light that is incident from the diffractive lens 16 to the objective lens, and reflects the light that is incident from the objective lens to the diffractive lens 16. In the case where the case part 5 includes the bent part, the outer shapes of the first fixing part 11 and the second fixing part 12 are still within the outer shape of the cylindrical part 10 when viewed in the direction of the central axis 10a of the cylindrical part 10, so as to prevent the first fixing part 11 and the second fixing part 12 from interfering with other members, and increase the flexibility of installation of the sensor head 100.

Furthermore, the diffractive lens 16 may be disposed on the side of the measurement object 200 with respect to the objective lens group 21, 23, 25, and 27.

<Fiber Case>

The fiber case 40 houses an optical fiber inside and is fixed to the cylindrical part 10 via a flat spring 41. The flat spring 41 is screwed to the upper part of the cylindrical part 10 by a first screw 31 and screwed to the end part of the cylindrical part by a third screw 43.

The cylindrical part 10 of the case part 5 has an insertion hole 19 in the end part for inserting the optical fiber optically connected to the diffractive lens 16. The insertion hole 19 is formed in the end part, to which the objective lens part 20 is connected, of the cylindrical part 10 and the end part on the opposite side. The optical fiber with the ferrule 42 mounted at the front end is inserted into the insertion hole 19. In FIG. 4, only the ferrule 42 is shown and the optical fiber is omitted.

<Fixing Part>

As shown in FIG. 5, the first fixing part 11 and the second fixing part 12 are provided to overlap an axis orthogonal to the central axis of the cylindrical part 10 when viewed in the central axis direction of the cylindrical part 10. In FIG. 5, a vertical center line 10b and a horizontal center line 10c are illustrated as a plurality of axes orthogonal to the central axis of the cylindrical part 10. The first fixing part 11 and the second fixing part 12 are provided to extend in the same direction as the horizontal center line 10c and overlap the horizontal center line 10c. In this manner, the widths of the first fixing part 11 and the second fixing part 12 can be maximized in a range that the first fixing part 11 and the second fixing part 12 are within the outer shape of the cylindrical part 10, and the fixing to the fixing object can be further strengthened.

In addition, the first fixing part 11 and the second fixing part 12 are plate-shaped and have two flat surfaces parallel to each other. That is, the first fixing part 11 has a plate shape having an upper first flat surface 11a and a lower first flat surface 11b, and the second fixing part 12 has a plate shape having an upper second flat surface 12a and a lower second flat surface 12b. With the first fixing part 11 and the second fixing part 12 being plate-shaped and having two flat surfaces parallel to each other, if the fixing object has a flat surface, the first fixing part 11 and the second fixing part 12 can be fixed to make surface contact with the fixing object, and the sensor head 100 can be firmly fixed easily.

Here, the upper first flat surface 11a, the lower first flat surface 11b, the upper second flat surface 12a, and the lower second flat surface 12b respectively extend along the central axis of the cylindrical part 10. That is, the first fixing part 11 and the second fixing part 12 extend along the central axis of the cylindrical part 10. The central axis direction of the cylindrical part 10 is almost consistent with the optical axis direction of the diffractive lens 16 and the objective lens. Therefore, when the first fixing part 11 and the second fixing part 12 are fixed to the fixing object, the optical axis direction of the diffractive lens 16 and the objective lens is oriented in the direction along the fixing object surface of the fixing object, and it is easy to align the sensor head 100.

As shown in FIG. 2 to FIG. 4, the first fixing part 11 and the second fixing part 12 are provided at positions different from the diffractive lens 16, the objective lens group 21, 23, 25, and 27, and the collimating lens 15 in the central axis direction of the cylindrical part 10. More specifically, the diffractive lens 16 and the collimating lens 15 are provided inside the cylindrical part 10, and the objective lens group 21, 23, 25 and 27 is provided inside the objective lens part 20, whereas the first fixing part 11 and the second fixing part 12 are provided in the end part of the cylindrical part 10 in the central axis direction of the cylindrical part 10. In this manner, the first fixing part 11 and the second fixing part 12 are provided at positions that do not interfere with the diffractive lens 16 and the objective lens, and consequently the presence of the first fixing part 11 and the second fixing part 12 is not a factor that narrows the apertures of the diffractive lens 16 and the objective lens. Therefore, while the apertures of the diffractive lens 16 and the objective lens are increased to nearly the inner diameter of the case part 5 to sufficiently increase the amount of light taken in, the first fixing part 11 and the second fixing part 12 can be large enough to fix the sensor head 100. Further, by providing the first fixing part 11 and the second fixing part 12 in the end part of the cylindrical part 10 in the central axis direction of the cylindrical part 10, the presence of the first fixing part 11 and the second fixing part 12 is not a factor that narrows the aperture of the case part 5. Therefore, while the inner diameter of the case part 5 is increased to sufficiently increase the amount of light taken in, the first fixing part 11 and the second fixing part 12 can be large enough to fix the sensor head 100.

The first fixing part 11 and the second fixing part 12 are provided at positions overlapping the insertion hole 19 in the central axis direction of the cylindrical part 10. In other words, the first fixing part 11 and the second fixing part 12 overlap the insertion hole 19 in the side view of the cylindrical part 10. Thus, the total length of the case part in the central axis direction of the cylindrical part 10 can be reduced as compared with the case where the first fixing part 11 and the second fixing part 12 are provided at positions not overlapping the insertion hole 19 in the end part of the cylindrical part 10, and the sensor head 100 can be downsized. In addition, by providing the first fixing part 11 and the second fixing part 12 at positions overlapping the insertion hole 19 in the central axis direction of the cylindrical part 10, the place where the sensor head 100 is fixed can be set close to the centroid of the sensor head 100 and the fixing can be further stabilized.

The first fixing part 11 and the second fixing part 12 are integrally formed with the case part 5. More specifically, the first fixing part 11 and the second fixing part 12 are integrally formed with the cylindrical part 10, and the first fixing part 11 and the second fixing part 12 are respectively formed continuously with the cylindrical part 10. By fixing the first fixing part 11 and the second fixing part 12 to the fixing object, the case part 5 is also fixed and the sensor head 100 is securely fixed to the fixing object.

[Example of Use]

Figure 6:
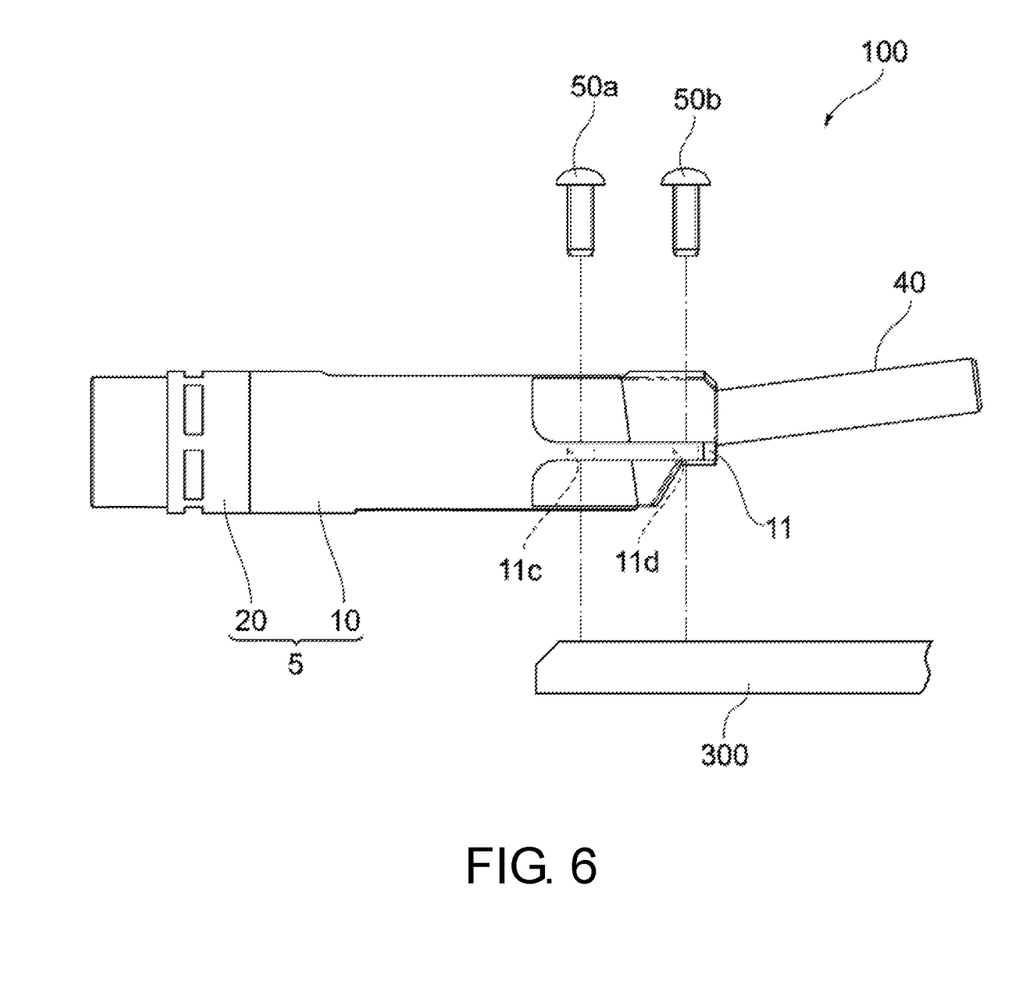
FIG. 6 is a side view of the sensor head according to the present embodiment.

Next, an example of use of the sensor head 100 according to the present embodiment will be described with reference to FIG. 6 to FIG. 8. FIG. 6 is a side view of the sensor head 100 according to the present embodiment. In FIG. 6, a fixing object 300, and a first fixing screw 50a and a second fixing screw 50b for screwing the first fixing part 11 to the fixing object 300 are shown.

The first fixing part 11 has a first through hole 11c and a second through hole 11d. Like the first fixing part 11, the second fixing part 12 has a first through hole and a second through hole (not shown). The first fixing screw 50a is disposed through the first through hole 11c of the first fixing part 11 and the second fixing screw 50b is disposed through the second through hole 11d to be screwed and fixed to the fixing object 300. Although not shown in FIG. 6, fixing screws are respectively disposed through the two through holes of the second fixing part 12 to be screwed and fixed to the fixing object 300. The through holes provided in the first fixing part 11 and the second fixing part 12 may be holes that are smooth on the inner side or screw holes formed with threads on the inner side. Since the first fixing part 11 and the second fixing part 12 have the through holes, the first fixing part 11 and the second fixing part 12 can be fixed to the fixing object 300 by screws, and the sensor head 100 can be easily fixed.

Figure 7:
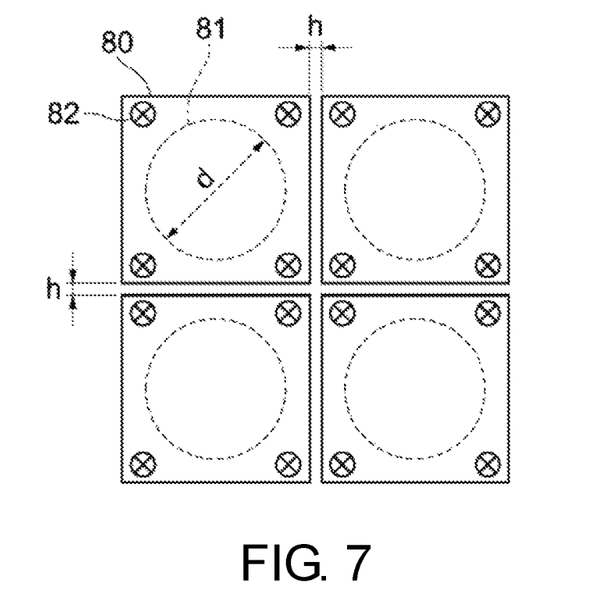
FIG. 7 is a front view showing a case where a plurality of sensor heads of a conventional example are densely arranged.

FIG. 7 is a front view showing a case where a plurality of sensor heads of a conventional example are densely arranged. FIG. 7 shows a front view of an objective lens part 80 according to a conventional example, which houses an objective lens 81 of the conventional example. The objective lens 81 of the conventional example has a diameter d, and the objective lens part 80 of the conventional example has a width and a height larger than the diameter d of the objective lens 81 of the conventional example, so as to include screw holes 82 at the four corners.

In the case of fixing a plurality of sensor heads of the conventional example to the fixing object, it is necessary to fix them apart from each other by at least the distance h. Since the width and height of the objective lens part 80 are large with respect to the diameter d of the objective lens 81 and the sensor heads of the conventional example have to be fixed apart by at least the distance h, when the sensor heads of the conventional example are disposed densely, the density is not sufficiently high.

Figure 8:
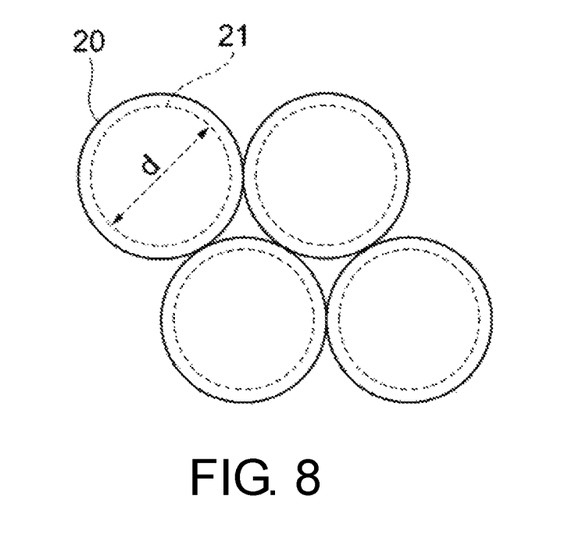
FIG. 8 is a front view showing a case where a plurality of the sensor heads according to the present embodiment are densely arranged.

FIG. 8 is a front view showing a case where a plurality of the sensor heads 100 according to the present embodiment are densely arranged. FIG. 8 shows the objective lens parts 20 of the sensor head 100 according to the present embodiment and a part of the objective lens group housed in the objective lens part 20. The diameter of the objective lens housed in the sensor head 100 according to the present embodiment is d which is the same as the diameter of the objective lens 81 of the conventional example. In addition, the objective lens part 20 of the sensor head 100 according to the present embodiment has a diameter slightly larger than the diameter d of the first lens 21.

Figure 9:
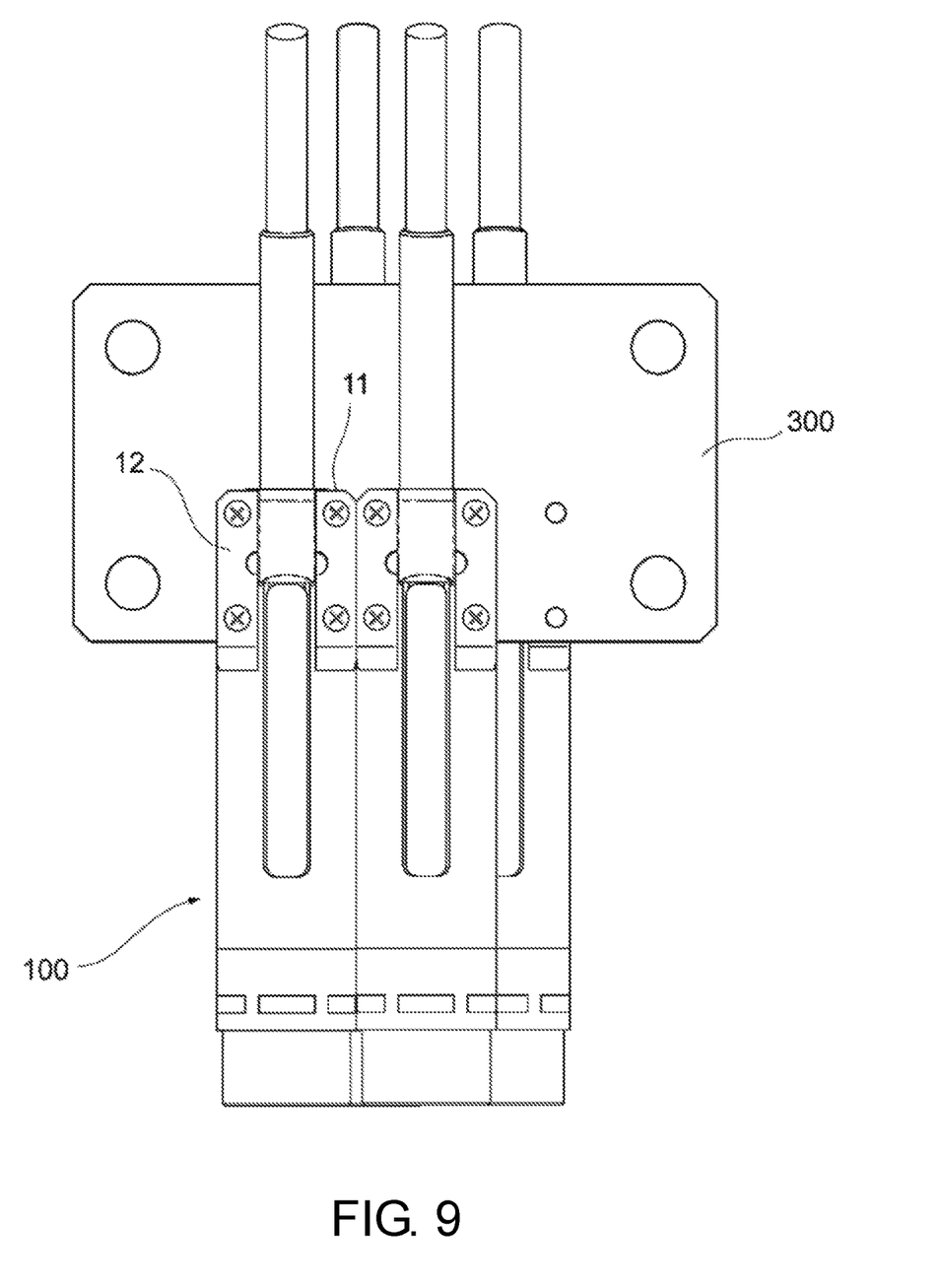
FIG. 9 is a top view showing a case where a plurality of the sensor heads according to the present embodiment are densely arranged.

FIG. 9 is a top view showing a case where a plurality of the sensor heads 100 according to the present embodiment are densely arranged. FIG. 9 shows an example that a plurality of the sensor heads 100 are fixed to the front side and the rear side of the plate-shaped fixing object 300 respectively. As shown in FIG. 9, the first fixing part 11 and the second fixing part 12 are screwed to the fixing object 300. The thickness of the plate-shaped fixing object 300 may be set such that the sensor heads 100 fixed to the front side of the fixing object 300 and the sensor heads 100 fixed to the rear side of the fixing object 300 are in contact.

Since the first fixing part 11 and the second fixing part 12 of each sensor head 100 of the present embodiment do not protrude from the case part 5 and the case part 5 has a cylindrical outer shape, when a plurality of the sensor heads 100 of the present embodiment are arranged side by side, they can be fixed with a relatively short distance between the lenses such as the first lens 21. Then, as shown in FIG. 8 and FIG. 9, a plurality of the sensor heads 100 can be arranged side by side to bring a plurality of objective lens parts 20 into close contact with each other, and the sensor heads 100 can be fixed densely with a shorter distance therebetween than the conventional example.

The embodiment described above is intended to facilitate understanding of the disclosure and is not intended to limit the disclosure. The elements included in the embodiment and their arrangement, material, condition, shape, size, etc. are not limited to those exemplified and can be modified as appropriate. In addition, it is possible to partially replace or combine the configurations shown in different embodiments.

[Appendix]

A sensor head of a sensor for measuring displacement of a measurement object (200), the sensor head comprising:

a diffractive lens (16) generating chromatic aberration along an optical axis direction on an incident light;

a case part (5) housing at least the diffractive lens (16) inside; and a fixing part (11, 12) used for fixing to a fixing object (300), wherein the case part (5) comprises a cylindrical part (10) that has a cylindrical outer shape, and an outer shape of the fixing part (11, 12) is within the outer shape of the cylindrical part (10) when viewed in a central axis direction of the cylindrical part (10).

What is claimed is:

1. A sensor head of a sensor for measuring displacement of a measurement object, the sensor head comprising:

a diffractive lens generating chromatic aberration along an optical axis direction on an incident light;

a case part housing at least the diffractive lens inside; and a fixing part being plate-shaped and used for fixing to a fixing object, wherein the case part has two concave portions opposite to each other, and the fixing part is formed between the two concave portions, the case part comprises a cylindrical part that has a cylindrical outer shape, and an outer shape of the fixing part is within the outer shape of the cylindrical part when viewed in a central axis direction of the cylindrical part.

2. The sensor head according to claim 1, wherein the fixing part extends to overlap an axis orthogonal to the central axis when viewed in the central axis direction of the cylindrical part.

3. The sensor head according to claim 2, wherein the fixing part is provided at a position different from the diffractive lens in the central axis direction of the cylindrical part.

4. The sensor head according to claim 2, wherein the fixing part is formed integrally with the case part.

5. The sensor head according to claim 2, wherein the fixing part is plate-shaped and has two flat surfaces parallel to each other.

6. The sensor head according to claim 2, wherein the fixing part has a through hole.

7. The sensor head according to claim 1, wherein the fixing part is provided at a position different from the diffractive lens in the central axis direction of the cylindrical part.

8. The sensor head according to claim 7, wherein the fixing part is provided in an end part of the cylindrical part in the central axis direction of the cylindrical part.

9. The sensor head according to claim 8, wherein the cylindrical part has an insertion hole in the end part for inserting an optical fiber optically connected to the diffractive lens, and the fixing part is provided at a position overlapping the insertion hole in the central axis direction of the cylindrical part.

10. The sensor head according to claim 9, wherein the fixing part is formed integrally with the case part.

11. The sensor head according to claim 9, wherein the fixing part is plate-shaped and has two flat surfaces parallel to each other.

12. The sensor head according to claim 8, wherein the fixing part is formed integrally with the case part.

13. The sensor head according to claim 8, wherein the fixing part is plate-shaped and has two flat surfaces parallel to each other.

14. The sensor head according to claim 7, wherein the fixing part is formed integrally with the case part.

15. The sensor head according to claim 7, wherein the fixing part is plate-shaped and has two flat surfaces parallel to each other.

16. The sensor head according to claim 1, wherein the fixing part is formed integrally with the case part.

17. The sensor head according to claim 16, wherein the fixing part is plate-shaped and has two flat surfaces parallel to each other.

18. The sensor head according to claim 1, wherein the fixing part has two flat surfaces parallel to each other.

19. The sensor head according to claim 18, wherein the flat surfaces extend along the central axis of the cylindrical part.

20. The sensor head according to claim 1, wherein the fixing part has a through hole.

* * * * *